DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 5, 1976

951 O.G. 8

T951,009

POLYMERISATION CATALYST

James Frank Robert Jaggard, Ludwigshafen, Germany, assignor to Imperial Chemical Industries Limited, London, England Filed Nov. 17, 1975, Ser. No. 632,664
Claims priority, application United Kingdom, Nov. 20, 1974, 50,250
Int. Cl.[2] C08F *4/64, 10/06*
U.S. Cl. 526—128
No Drawing. 31 Pages Specification Olefine monomer polymerization catalysts are described composed of a ground product which comprises (1) a solid compound of a transition metal such as the halide or oxyhalide of zirconium, vanadium or titanium, preferably titanium trichloride, which is ground together with (2) a Lewis base which is itself effective to alter the activity and/or stereospecificity of a Ziegler-type catalyst; octamethylphyrophosphoramide is preferred. The molar proportion of the Lewis Base compound ground with the transition metal compound is less than the number of moles of the transition metal compound and conveniently from 0.01 up to 0.75 mole for each mole of the transition metal compound. A metal halide such as aluminum chloride may also be included during the milling in amounts of from 0.01 to 0.5 preferably 0.10 up to 0.40 mole of the metal halide for each mole of the transition metal compound. The two components are ground together in a ball mill or the like and then contacted with propylene for a time sufficient for from 0.1 up to 5.0 moles of propylene to be taken up by the transition metal compound.

The thus ground product is then used as an olefine polymerization catalyst, especially propylene, together with an organic compound of a non-transition metal, for example aluminum. The catalyst may also include a Lewis Base compound and/or a polyene such as cycloheptatriene.

Catalyst systems of the type described are of high activity and used in any conventional olefine polymerization manner to produce propylene polymers containing a low proportion of soluble polymer.